(12) United States Patent
Curtis et al.

(10) Patent No.: US 7,787,388 B2
(45) Date of Patent: Aug. 31, 2010

(54) METHOD OF AND A SYSTEM FOR AUTONOMOUSLY IDENTIFYING WHICH NODE IN A TWO-NODE SYSTEM HAS FAILED

(75) Inventors: Paul Michael Curtis, Sudbury, MA (US); Maxim Gerard Smith, Natick, MA (US)

(73) Assignee: Egenera, Inc., Marlboro, MA (US)

( * ) Notice: Subject to any disclaimer, the term of this patent is extended or adjusted under 35 U.S.C. 154(b) by 281 days.

(21) Appl. No.: 12/126,547

(22) Filed: May 23, 2008

(65) Prior Publication Data

US 2009/0290483 A1 Nov. 26, 2009

(51) Int. Cl.
*H04L 12/26* (2006.01)
(52) U.S. Cl. ...................... 370/249; 714/716
(58) Field of Classification Search ................ 370/241, 370/242–245, 248, 249, 252–253; 714/712–716
See application file for complete search history.

(56) References Cited

U.S. PATENT DOCUMENTS 7,596,093 B2 * 9/2009 Chuah et al. ................ 370/241

2006/0056303 A1 * 3/2006 Aggarwal et al. ........... 370/248

* cited by examiner

*Primary Examiner*—Ricky Ngo
*Assistant Examiner*—Pao Sinkantarakorn
(74) *Attorney, Agent, or Firm*—Wilmer Cutler Pickering Hale and Dorr LLP

(57) ABSTRACT

A method of and a system for autonomously identifying which node in a two-node system has failed are described. The system includes two nodes and a fault-tolerant communication fabric. The fabric defines a plurality of communication paths connecting the two nodes, and fault-tolerant loop-back communication in which each node can send a message to itself utilizing at least one switch structure of the fabric. In addition, each of the two nodes includes logic for performing the service; logic for testing the functionality of the respective node; logic for sending test result messages to both nodes; fault-isolation logic for analyzing test result messages from both nodes; and logic for disabling the other node from performing the service only if the fault-isolation logic determines that the respective node is capable of successfully performing the service and also determines that the other node is incapable of successfully performing the service.

32 Claims, 11 Drawing Sheets

Decision Table 500
Used by each node independently

| Test1<br>(Testing self) | Test 2<br>(Testing the other node) | Action |
|---|---|---|
| Pass<br>(I am healthy) | Pass<br>(The other node is healthy) | Continue normal operation<br>(All is fine) |
| Pass<br>(I am healthy) | Fail<br>(The other node is not healthy) | Disable the other node<br>(And take over its responsibilities) |
| Fail<br>(I am not healthy) | Any<br>(Can't trust my own judgment) | Cease service<br>(Anticipate getting disabled by the other node) |

FIG. 5

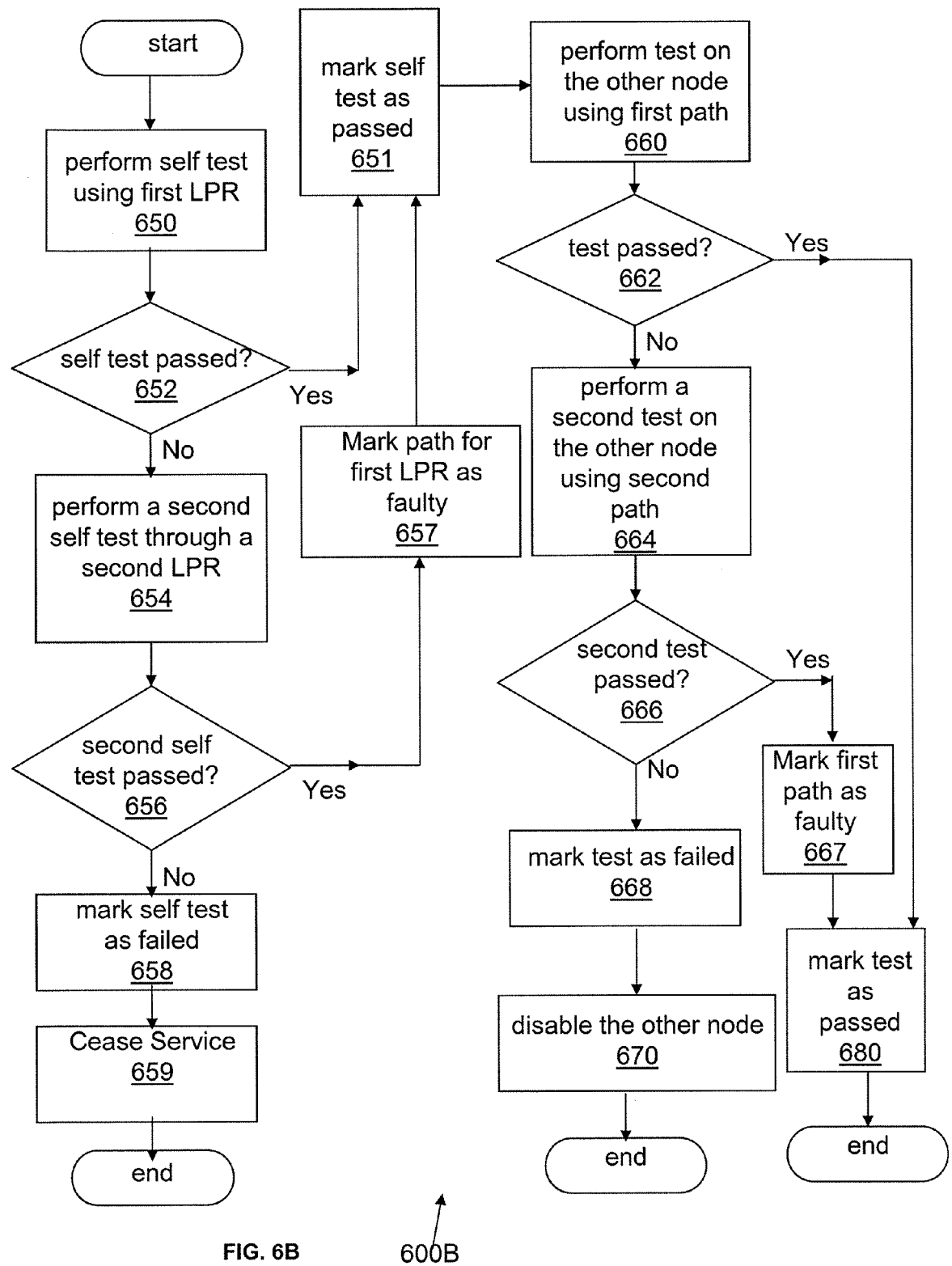
FIG. 6B    600B

METHOD OF AND A SYSTEM FOR AUTONOMOUSLY IDENTIFYING WHICH NODE IN A TWO-NODE SYSTEM HAS FAILED

FIELD OF INVENTION

The present invention generally relates to fault-tolerant systems and more particularly to two-node systems that can autonomously detect and identify which of the two nodes has suffered a failure.

BACKGROUND

Many present-day systems need to provide a reliable service to their clients. Examples include e-commerce systems that provide online shopping or reservation services, online banking systems, network control systems, database servers, and web servers. Such systems are often constructed to be fault-tolerant. That is, the system should be able to provide an uninterrupted service even if a component or subsystem becomes inoperative.

Individual components may fail for different reasons, which include hardware and software failures. If a failure occurs in a resource that is shared among multiple components, it might affect all of those components. For example a hardware failure in a power supply that services multiple components may bring all those components down. Some types of failures may only occur under special conditions, and under those conditions they may affect more than one component at the same time. Examples of these conditional failures include some software failures due to software bugs, for example the Y2K bug or the start or end of daylight saving time.

In order to achieve tolerance against single component failures, systems may utilize multiple redundant nodes (alternatively called agents, modules or hosts) to provide each service. Typically these independent nodes are built from independent components and are supplied by independent power sources. Each node alone is capable of performing all the tasks needed in the service, even if all other nodes fail. In other words, each node is a duplicate of any other node for performing those specific tasks. A failure in any one node does not affect the ability of any other node to provide the complete service, because the components of various nodes are independent of each other. The risk of a multiple failure that disables all nodes at once can be made as small as desired by providing a large number of independent nodes.

Making the various nodes independent of each other is complicated because the nodes must communicate with each other. Communication among the nodes is required for several reasons. First of all the nodes must agree among themselves which of their number is handling any particular client's request for service. Moreover, any node that changes the ongoing state of the service must inform other nodes of that change. For example, in an airline reservation system, if a client wishes to book an airline seat, one and only one node should be taking an available seat from the pool and reserve it for the client. Then the node that books the seat must inform other cooperating nodes that the seat is now taken. Finally, the communication is needed in case of a failure of an active node, so that one of the other nodes may take over the failed node's responsibilities.

For mission critical systems, it is important to equip the system with communication fabrics that are themselves robust and fault-tolerant. Such robustness is needed to achieve a consistent service to the client and to avoid catastrophic errors. One example of a catastrophic error, termed a split-brain syndrome, occurs when two or more duplicate nodes lose connection with each other, and each assumes, falsely, that the others are not functioning and thus decides to serve all requests by itself. Such a situation might result in serious errors, like double booking, double charging of a client, memory corruption, or database errors. To provide a robust communication fabric, the nodes are often connected to each other and to the outside world through multiple redundant paths, such that when one of the paths fails, another path can be utilized by the nodes to communicate with each other and with the outside world.

Even in the presence of robust communication fabrics, individual nodes in the system may fail and cease to perform their tasks. Thus the system must have a way to find out that there is a failure, and further to determine which node or communication path has failed and should be removed from the service, and which is still healthy and thus should survive to continue to offer service. If by mistake the system removes a healthy component from service instead of the one that has failed, then not only will the system have less of the healthy components than before the failure, but also the failed component will remain operational and capable of causing further damage.

One typical solution to the problem of fault tolerance is called triple modular redundancy (TMR), which uses a majority vote mechanism. In TMR at least three nodes are provided to perform any service. That way, if there is a failure in any one of the nodes, its behavior will differ from that of both of the other two healthy nodes, and those two constitute a majority of the three nodes. A comparison among outputs if all nodes is performed by at least three health monitors, each of which monitors and compares the behavior of all the nodes, using independent communication paths between all monitors and all nodes. This approach is more costly and complicated than an approach using only two nodes in the system.

SUMMARY OF THE INVENTION

The invention provides a method of and a system for autonomously identifying which node in a two-node system has failed. Failures are assumed sufficiently rare that the system need not deal with more than one of them at a time.

According to one aspect of the invention, a fault-tolerant, two-node system for performing a service in a manner that autonomously isolates and disables a failing node from disrupting the service is provided. The system includes a first and a second node, each of which include a communication fabric interface, and a fault-tolerant communication fabric that has a plurality of switch structures and links. The fabric defines a plurality of communication paths connecting the communication fabric interfaces of the first node and the second node, and the fabric provides fault-tolerant loop-back communication in which the first node can send a message to itself utilizing at least one switch structure of the fabric, and in which the second node can send a message to itself utilizing at least one switch structure of the fabric. In addition, each of the two nodes includes logic for performing the service in accordance with a service delivery model; logic for testing the functionality of the respective node to determine whether the respective node is capable of successfully performing the service; logic, responsive to the testing logic, for sending test result messages to the respective node using loop-back communication provided by the fault-tolerant fabric and for sending test result messages to the other node using a communication path defined by the fault-tolerant fabric; fault-isolation logic for analyzing test result messages from the respective node and from the other node to determine whether the respective node or the other node is capable of successfully performing the service; and logic for disabling the other node from performing the service only if the fault-isolation logic determines that the respective node is capable of successfully performing the service and also determines that the other node is incapable of successfully performing the service. The fault-tolerant, two-node system further includes logic, responsive to the logic for disabling, to continue delivery of the service in accordance with the service delivery model.

According to another aspect of the invention, the fault-isolation logic analyzes the test result messages to first determine whether the respective node is capable of successfully performing the service, before determining whether the other node is capable of successfully performing the service.

According to another aspect of the invention, the fault-isolation logic determines that the other node is incapable of successfully performing the service by receiving test result messages with incorrect content or by failing to receive test result messages from the other node within a specified time frame.

According to another aspect of the invention, the logic for testing is initiated autonomously by the respective node.

According to another aspect of the invention, the logic for testing is initiated by a request message from the other node.

According to another aspect of the invention, the testing logic performs pre-specified tests selected from the group including: test to determine whether a block of node memory can be successfully allocated, test to determine whether a mutual-exclusion lock can be successfully obtained and released, test to determine whether a node can successfully schedule a program thread for execution, test to determine whether a node can successfully read or write a database record, and forward-progress test.

According to another aspect of the invention, the logic for disabling the other node includes logic for attempting recovery of the other node by causing the other node to re-boot.

According to another aspect of the invention, the logic for disabling the other node includes logic to disable power to the other node.

According to another aspect of the invention, the service delivery model is active-passive in which one node is in active status and is responsible for actively performing the service and another node is in passive status and is responsible for maintaining a hot standby state to assume the active status if the one node is disabled from performing the service.

According to another aspect of the invention, the service delivery model is active-active in which both nodes are in active status and are responsible for actively performing the service and if one node is disabled from performing the service the other node continues delivery of the service.

According to another aspect of the invention, each communication fabric interface includes at least two physical connections to the communication fabric, and the communication fabric defines at least two independent communication paths respectively connecting a first and a second of the two physical connections of the first node to a first and a second of the two physical connections of the second node. Further, the communication fabric defines at least two independent loop-back routes for each node, each loop-back route having corresponding links and switch structures.

According to another aspect of the invention, the logic for sending test result messages includes logic to send the test result messages on a first independent loop-back route and for sending test result messages on a second independent loop-back route, if messages sent on the first loop-back route are not received successfully. Moreover, the system further includes logic to identify the first loop-back route as faulty, if test result messages on the second independent loop-back route are received successfully.

According to another aspect of the invention, the logic for sending test result messages includes logic to send the test result messages on a first independent communication path to the other node and for switching to sending test result messages on a second independent communication path, if messages sent on the first independent communication path are not received successfully by the other node. Moreover, the system includes logic to identify the first independent communication path as faulty, if test result messages on the second independent communication path are received successfully.

According to another aspect of the invention, the test result messages received from the other node include a log of messages received by the other node, and the logic for sending test result messages analyzes the log to determine whether messages sent on the first independent communication path are not being received successfully by the other node.

According to another aspect of the invention, the logic for sending test result messages switches to sending test result messages on the second independent communication path, if the fault-isolation logic fails to receive test result messages from the other node for a specified time frame, and further the first independent communication path is identified as faulty if the fault-isolation logic receives test result messages with correct content after the switching.

According to another aspect of the invention, the logical union of the set of links and switch structures used by a loop-back route for the first node and the set of links and switch structures used by a loop-back route for the second node includes all of the links and switch structures used in an independent communication path connecting the two nodes.

According to another aspect of the invention, each loop-back route for each node is defined by a sequence starting and ending at the corresponding node and including the switch structures corresponding to the loop-back route. Further, the logic for sending test result messages attaches to each test message sent on each one of the two loop-back routes a unique target address that signifies the one loop-back route, and each one switch structure in the sequence is programmed to receive the test result message sent on the corresponding loop-back route from the corresponding node or the switch structure that is before the one switch structure in the sequence and, based on the unique target address, to send that message to the switch structure or to the corresponding node which is after the one switch structure in the sequence.

According to another aspect of the invention, a method in a system of two nodes, connected via a fault-tolerant communication fabric that includes a plurality of switch structures and links, for performing a service in a fault-tolerant manner that autonomously isolates and disables a failing node from disrupting the service is provided. The method is performed by each of the two nodes and includes performing the service in accordance with a service delivery model; testing the functionality of the respective node to determine whether the respective node is capable of successfully performing the service; sending test result messages to the respective node using loop-back communication that is provided by the fault-tolerant fabric and utilizes at least one switch structure of the fabric; sending test result messages to the other node using a communication path defined by the fault-tolerant fabric; analyzing test result messages from the respective node and from the other node to determine whether the respective node or the other node is capable of successfully performing the service; disabling the other node from performing the service only if it is determined that the respective node is capable of successfully performing the service and also it is determined that the other node is incapable of successfully performing the service; and continuing delivery of the service in accordance with the service delivery model.

According to another aspect of the invention, the test result messages are analyzed to first determine whether the respective node is capable of successfully performing the service, before determining whether the other node is capable of successfully performing the service.

According to another aspect of the invention, it is determined that the other node is incapable of successfully performing the service if test result messages received from the other node have incorrect content or no test result messages are received from the other node within a specified time frame.

According to another aspect of the invention, testing the functionality of the respective node is initiated autonomously by the respective node.

According to another aspect of the invention, testing the functionality of the respective node is initiated by a request message from the other node.

According to another aspect of the invention, testing the functionality of the respective node includes performing pre-specified tests selected from the group including: test to determine whether a block of node memory can be successfully allocated, test to determine whether a mutual-exclusion lock can be successfully obtained and released, test to determine whether a node can successfully schedule a program thread for execution, test to determine whether a node can successfully read or write a database record, and forward-progress test.

According to another aspect of the invention, disabling the other node includes attempting recovery of the other node by causing the other node to re-boot.

According to another aspect of the invention, disabling the other node includes disabling power to the other node.

According to another aspect of the invention, the communication fabric defines at least two independent communication paths connecting the two nodes, and also the communication fabric defines at least two independent loop-back routes for each node, each loop-back route having corresponding links and switch structures. Moreover, analyzing test result messages includes diagnosing the communication fabric.

According to another aspect of the invention, sending test result messages to the respective node includes sending the test result messages on a first independent loop-back route and sending test result messages on a second independent loop-back route, if messages sent on the first loop-back route are not received successfully, and diagnosing the communication fabric includes identifying the first loop-back route as faulty, if test result messages on the second independent loop-back route are received successfully.

According to another aspect of the invention, sending test result messages to the other node includes sending the test result messages on a first independent communication path to the other node and switching to sending test result messages on a second independent communication path, if messages sent on the first independent communication path are not received successfully by the other node. Further, diagnosing the communication fabric includes identifying the first independent communication path as faulty, if test result messages on the second independent communication path are received successfully.

According to another aspect of the invention, the method further includes including in the test result messages sent by each of the two nodes to other node a log of messages received from the other node. Moreover, the log in the test result messages from the other node is analyzed to determine whether messages sent on the first independent communication path are not received successfully by the other node.

According to another aspect of the invention, the method further includes switching to sending test result messages on the second independent communication path if no test result messages are received from the other node for a specified time frame. Moreover, diagnosing the communication fabric includes identifying the first independent communication path as faulty if test result messages are received from the other node with correct content after the switching.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In the Drawings,

FIG. 5 is a decision table used by each node in accordance with preferred embodiments of the invention;

FIG. 6B is another flowchart showing a sequence of actions that each node may take in accordance with some embodiments of the invention;

DETAILED DESCRIPTION

Preferred embodiments of the invention achieve fault tolerance in performing a service and at a low cost by utilizing two independent and redundant nodes. In preferred embodiments, the two nodes communicate with each other through at least two independent and redundant communication paths. Each node, running a test program, can monitor the health of itself and the other node, and can autonomously isolate a failure in either of the two nodes or in a communication path between the two nodes. Once it isolates a failure, a healthy node removes a failed node, or a failed communication path, from the service and continues to perform the service. The system sustains its operation utilizing the remaining healthy node and communication path, while the failure in the other node or in the communication path is being addressed.

Figure 1:
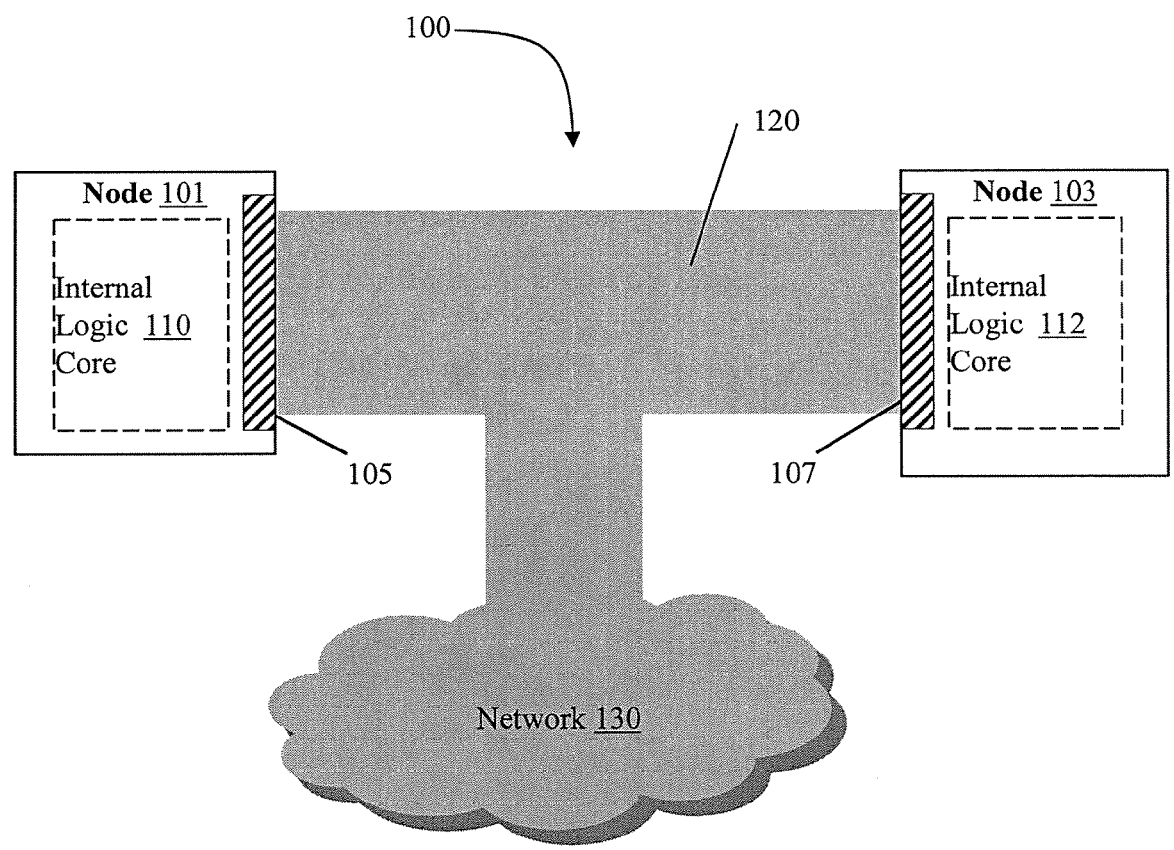
FIG. 1 is a system diagram of a system including two redundant nodes.

FIG. 1 is a system diagram of a two-node system 100. System 100 has two redundant nodes 101 and 103, which duplicate each other for a service, and a communication fabric 120.

Communication fabric 120 provides communication paths between the two nodes. It may also be part of the network that connects the two nodes with the outside world through the network 130. The communication fabric for example can include multiple network connections through Ethernet or through fibre-channel.

Nodes 101 and 103 include internal logic cores 110 and 112 and communication interfaces 105 and 107. Each internal logic core is responsible for performing the main tasks of its corresponding node. Each is also responsible for communicating with the other node and the rest of the world through the communication fabric 120. Communication interfaces 105 and 107 are responsible for connecting the corresponding internal logic core with the communication fabric 120. Conceptually, communication interfaces 105 and 107 may be considered as parts of the communication fabric 120. The nodes can for example be computers, or Egenera blades in an Egenera hardware platform. Interfaces 105 and 107 may be part of the nodes 101 and 103 respectively. For example, if the two nodes are two computer systems, and the communication fabric 120 is a network connection, then each interface can be the network interface card (NIC) of each computer.

Figure 2:
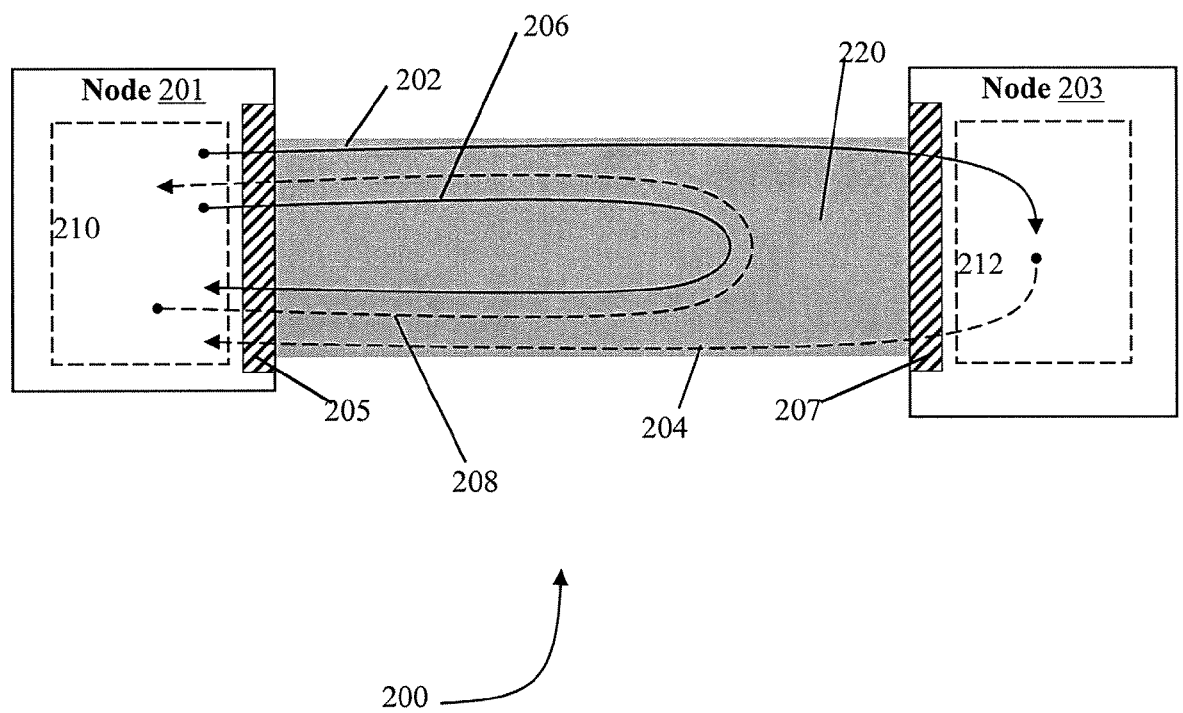
FIG. 2 is a system diagram of an autonomous fault-tolerant two-node system according to an embodiment of the present invention.

FIG. 2 is a system diagram of an autonomous fault-tolerant two-node system 200 according to an embodiment of the present invention. System 200 includes a communication fabric 220 and two nodes 201 and 203. FIG. 2 is also used to depict some of the communication messages exchanged between the two nodes and the messages sent by node 101 to itself. System 200 can for example be an Egenera hardware platform including multiple nodes in communication with each other and with the outside network. Nodes 201 and 203 can for example be two control nodes in an Egenera hardware platform, which for example perform the tasks of establishing and managing communication paths in the platform. Each control node is a single board that includes one or more processors and a local memory.

Communication fabric 220 is utilized by nodes 201 and 203 for communicating with each other, for example to share data, divide the work, and perform health tests. In preferred embodiments, communication fabric 220 is a robust channel that provides two or more independent and redundant communication paths between the two nodes, such that even when one of the paths between fails, the nodes can continue communicating by utilizing another path. Communication fabric 220 may also be used by each node for communicating with the outside network, e.g., the Internet, which is not shown in FIG. 2. In preferred embodiments the communication fabric includes Ethernet cables, network interface cards and switches, which are configured and programmed as explained in detail below.

Nodes 201 and 203 are the two nodes responsible for performing a specific service. In general, the two nodes must be both capable of performing the same set of tasks required by a specific service, and for those tasks they are duplicates of each other. The nodes may at the same time be performing other tasks that may not be shared between them, and may not be related to the service. Moreover, while in preferred embodiments the two nodes are physically identical, in some other embodiments they are not physically identical.

Node 201 includes internal logic core 210 and communication interface 205 for communicating through the communication fabric 220. Likewise, node 203 includes internal logic core 212 and communication interface 207. These components can be similar to those discussed in relation to FIG. 1. Specifically, each internal logic core is responsible for running the tasks performed by the node, including tasks related to the service, communications, and health tests. Each internal logic core communicates with the other internal logic core and with the outside world through the communication fabric 220 to which it is connected via communication interfaces.

According to some embodiments, each node in system 200 continually assesses the health of both itself and the other node, by submitting health tests to itself and to the other node. FIG. 2 depicts the health tests sent by node 201 to itself and to node 203. The arrow 202 denotes health test-initiation messages that are sent periodically by node 201 to node 203 in order to test the health of node 203. The arrow 204 denotes the replies to these test-initiations sent by node 203 back to node 201. Based on these replies, node 201 may decide whether the health test performed by node 201 on node 203 has passed or failed.

In system 200, node 203 similarly sends periodic test-initiations to node 201 and receives replies to those message from node 201 and based on these replies may decide whether the health test performed by node 203 on node 201 has passed or failed. These initiation-reply pairs are not shown in FIG. 2. In the preferred embodiments of the invention, the tests performed by node 201 on node 203, are identical to the tests performed by node 203 on node 201.

Returning to FIG. 2, the arrow 206 denotes the test-initiations sent periodically by node 201 to itself and the arrow 208 denotes the replies to these self-test initiations sent back by node 201 to itself. In the preferred embodiment, each node tests itself in the same way that the other node tests it, and thus the self-test-initiation messages 206 denote messages identical to the test-initiation sent by node 203 to node 201.

The self-test initiation-reply pairs 206-208 are each transmitted out through a loop-back route utilizing some components of the communication path to the other node, before they are returned to the originating node 201. The mechanism behind designing these routes will be explained in more detail below. With this design, node 201 tests itself as well as the communication interface 205 and some other components of the communication fabric used by node 203 to communicate with node 201. In system 200, node 203 also sends periodic self-test initiation-reply pairs to itself in a similar manner, utilizing the interface 207 and some other components of the communication fabric on its side. For each node, a loop-back route for self test-messages is defined on each communication path. In preferred embodiments, the loop-back routes of the two nodes on each communication path are designed such that together they cover all components of that communication path, that is, each component of that communication path belongs to the loop-back route of at least one of the nodes. In some embodiments, it suffices that the loop-back route for each node on each communication path utilizes one or more of the switches of the path, such that each message sent on the loop-back route exits the node and enters the redundant part of the path before returning to the node. Based on the results of these self-health tests, each node may decide whether the self-test performed by that node has passed or failed.

When executing a test, each node may originate a test and send a variety of test-initiations to itself or to the other node, and, based on replies returned by the target node, or possibly lack of a response, the originating node may decide whether the target node is reachable and healthy or not. In general, health tests may include sending to the target node a "ping" message, that is special network packets that request replies, or other types of network packets, to make sure the target node can communicate with the outside world.

In addition, health tests may include periodic work requests that exercise the basic functionalities underlying the tasks related to the service. For example, for a computer node, the health test may include allocating a memory block, taking and releasing a mutual-exclusion lock, scheduling a thread for execution, reading or writing a database record, verifying that sensors are within limits. The health tests may also include some forward progress tests to make sure the target node is not stuck in an infinite loop or any other situation in which the node sends false positive replies to health tests, but cannot service real requests. Such forward progress tests may apply to an active node and may check the value of a work progress counter, or other indications that shows the target node has progressed in servicing outside clients. A forward progress test may also check the value of an ever-increasing counter for an active or a passive node. In the preferred embodiments, the two sets of health tests performed on the two nodes are identical. In some embodiments, for example when the two nodes are not physically identical, these two sets of tests performed on the two nodes may be different. Typically these two sets of tests are chosen such that they test the same set of tasks on each node.

Each of the nodes, based on the replies it receives to test-initiations that it sends to itself or to the other node, will decide on the health of itself or the other node respectively. Each node marks each test as passed, if it receives acceptable replies to the test-initiation. An acceptable reply is a reply that includes results indicating that the respective node is sufficiently functional.

If all health tests pass, the node may conclude that both itself and the other node are healthy and no specific action is required. If no replies are received or the received replies are unacceptable, the node analyses the results using predefined logic (more below) to identify and isolate the failed component so that the failed component can be taken out of service appropriately based on the execution model employed. For example, if an active node fails, it will be taken out of service and the passive node will assume the active role.

For example, node 201 periodically sends self-test-initiations 206 to itself, and if it receives replies 208 that are consistent with the acceptable replies, it may conclude that itself is healthy. Similarly, node 201 periodically sends test-initiations 202 to node 203 and if it receives replies 204 that are consistent with the acceptable replies, it may conclude that node 203 is healthy. On the other hand, if a node does not receive acceptable replies to some of its test-initiations, it may conclude that the test has failed and either that or the other node is not healthy and it must take some action. In some preferred embodiments, before each node makes a final conclusion, it must make sure that the problem does not originate in the communication fabric.

For example, if node 201 does not receive some of the expected replies to the test-initiations it sends to node 203, or if the received replies 204 are not consistent with the acceptable replies, node 201 may have to perform re-tests to make sure that the problem really exists in node 203 and not in the utilized communication path between the two nodes. Node 201 typically performs a re-test by re-sending all or a subset of the test-initiations to node 203 utilizing a second communication path different from the first one it used the first time. If this re-test through the second path passes, node 201 may conclude that the failure is not in node 203 but in the first communication path between itself and node 203. Node 201 may thus mark the health test as passed, and may not take any further action except for possibly informing the system of the potential failure in the first communication path. On the other hand, if the re-test fails as well, node 201 may conclude that the failure originates in node 203, and mark the health test as failed.

Node 201 performs re-tests by utilizing alternative redundant communication paths to node 203. The redundant communication paths between nodes are built from independent components and independent power sources. In this way, a failure in one communication path between the nodes will not affect any other of the redundant paths between those nodes, irrespective of the location of the failure, whether inside either node or in a part of the path between the two nodes.

Figure 3A:
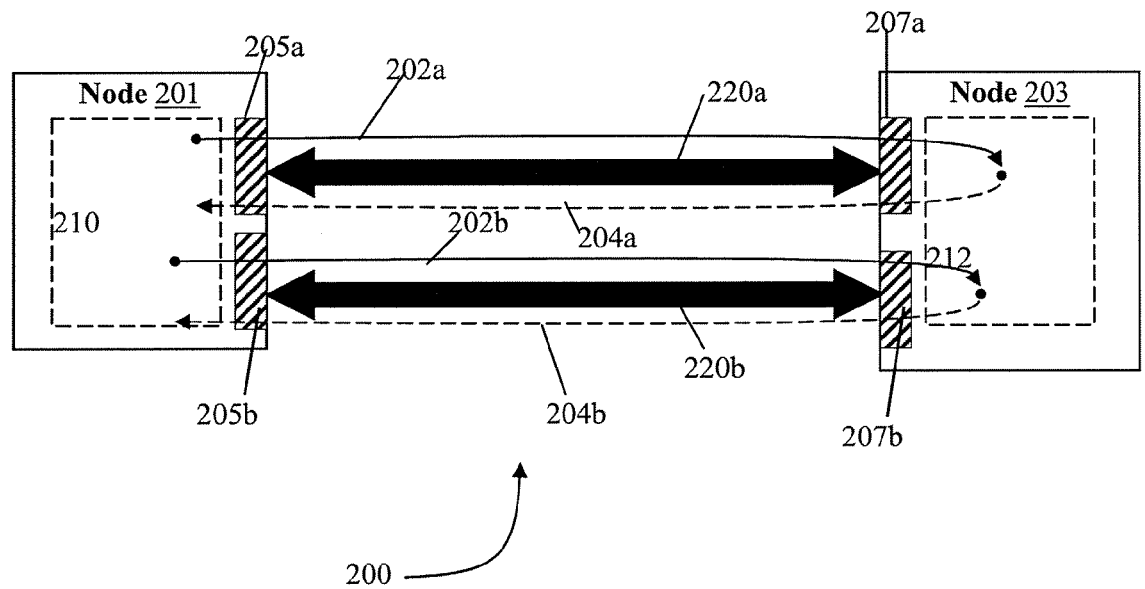
FIGS. 3A and 3B are system diagrams showing redundant paths in accordance with preferred embodiments of the invention.
Figure 3B:
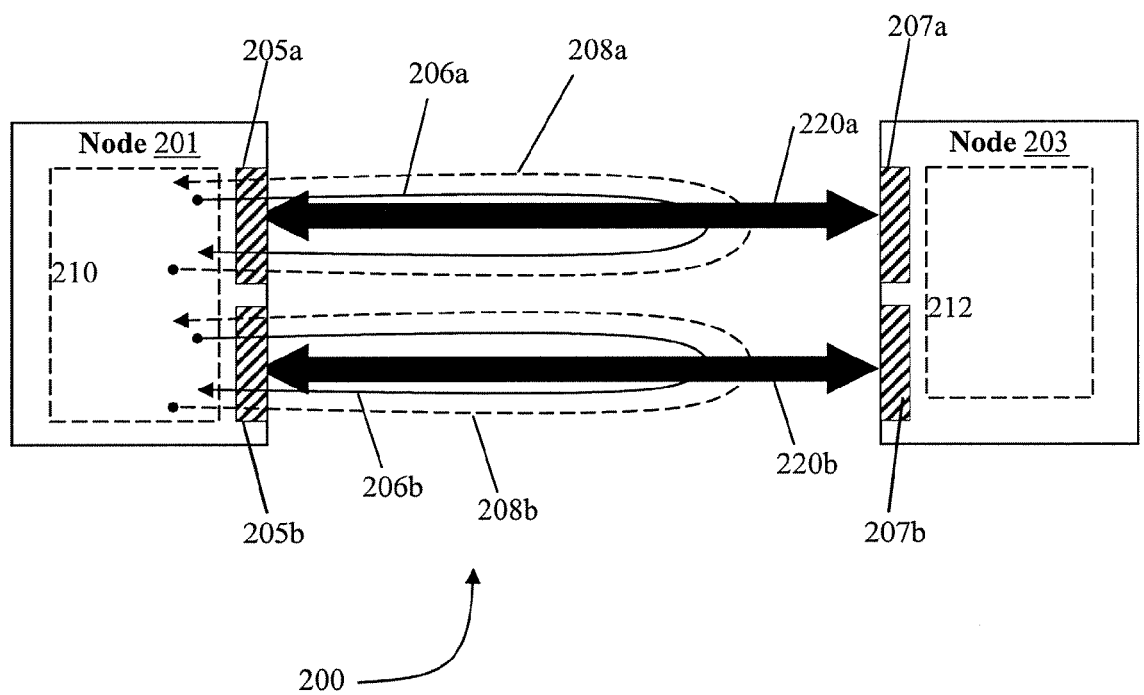

FIGS. 3A and 3B are system diagrams of the system 200 of FIG. 2, in which two of the redundant paths in the communication fabric 220 have been shown in more detail and in accordance with preferred embodiments of the invention. Communication fabric 220 of FIG. 2 includes at least two redundant and independent sub-channels, 220a and 220b. Communication interface 205 includes at least two redundant and independent communication interfaces 205a and 205b, and communication interface 207 includes at least two redundant and independent communication interfaces 207a and 207b. Sub-channels 220a and 220b are connected to node 201 respectively through interfaces 205a and 205b, and to node 203 respectively through interfaces 207a and 207b. Consequently, components 205a, 220a and 207a are parts of one communication path between the two nodes, and components 205b, 220b and 207b are parts of a different communication path, independent of the previous path.

FIG. 3A shows how these two independent paths are utilized to exchange two different sets of test initiation-reply pairs between the two nodes. Specifically test-initiations 202a and their replies 204a are sent through the first path, while test-initiations 202b and their replies 204b are sent through the second path. One of these pairs can belong to a first health test performed by node 201 on node 203 and the other pair can belong to a second health test, performed as a re-test by node 201 on node 203. If the first test fails, node 201 may send the re-test through the alternative path. If the re-test succeeds, node 201 may conclude that the problem exists not in the internal logic core of node 203 but in the communication path utilized for the first test and may inform the system of the possible failure in that path. Also, in this case, node 201 may mark the test as passed. On the other hand, if the re-test fails as well, node 201 may conclude that both communication paths cannot be at fault at the same time, and thus the failure must exist in the internal logic core 212 of node 203. In this case, node 201 may mark the health test as failed.

A different situation occurs when a self-test performed by a node on itself fails. For example in FIG. 2, if node 201 does not receive some of the expected replies to its self-test-initiations 206, or if the received replies 208 are not consistent with the acceptable replies, node 201 may not immediately conclude that itself has failed. In this case, node 201 may perform re-tests to make sure that the problem really exists in itself and not in the utilized communication path going out and returning to itself. Node 201 typically repeats the self-tests by sending the self-test-initiations utilizing a communication path to itself that is different from the first path used for the first self-test.

FIG. 3B shows how the two independent paths 205a-220a-207a and 205b-220b-207b are utilized to exchange two different sets of self-test initiation-reply pairs sent and received by node 201. Specifically self test-initiations 206a and their replies 208a are sent through the first path, while test-initiations 206b and their replies 208b are sent through the second path. One of these pairs can belong to a first self-test performed by node 201 on itself and the other pair can belong to a second self-test, performed as a re-test of the first self-test. If the first self-test fails, due to a missing or an unacceptable response, node 201 may perform the re-test through the alternative path. If the re-test succeeds, node 201 may conclude that the problem exists not in its own internal logic core but in the communication path utilized for the first self-test and may inform the system of the potential failure in that first path. Also, in this case, node 201 may mark the self-test as passed. On the other hand, if the re-test fails as well, node 201 may conclude that both communication paths cannot be at fault at the same time, and thus the failure must exist in its own internal logic core 210. In this case, node 201 may mark the self-test as failed.

Self-tests performed by each node through a communication path, requires the self-test-initiations and replies to be sent out of the node through the loop-back route on that communication path before they are returned to the same node. In preferred embodiments, the loop-back routes of the two nodes on each path may be designed such that each component of that communication path is utilized by the loop-back route of at least one of the nodes, and thus tested when that loop-back route is used by that node for a self-test. In some embodiments, the loop-back route of each node on each path includes at least one of the components of that route outside the node.

Figure 4A:
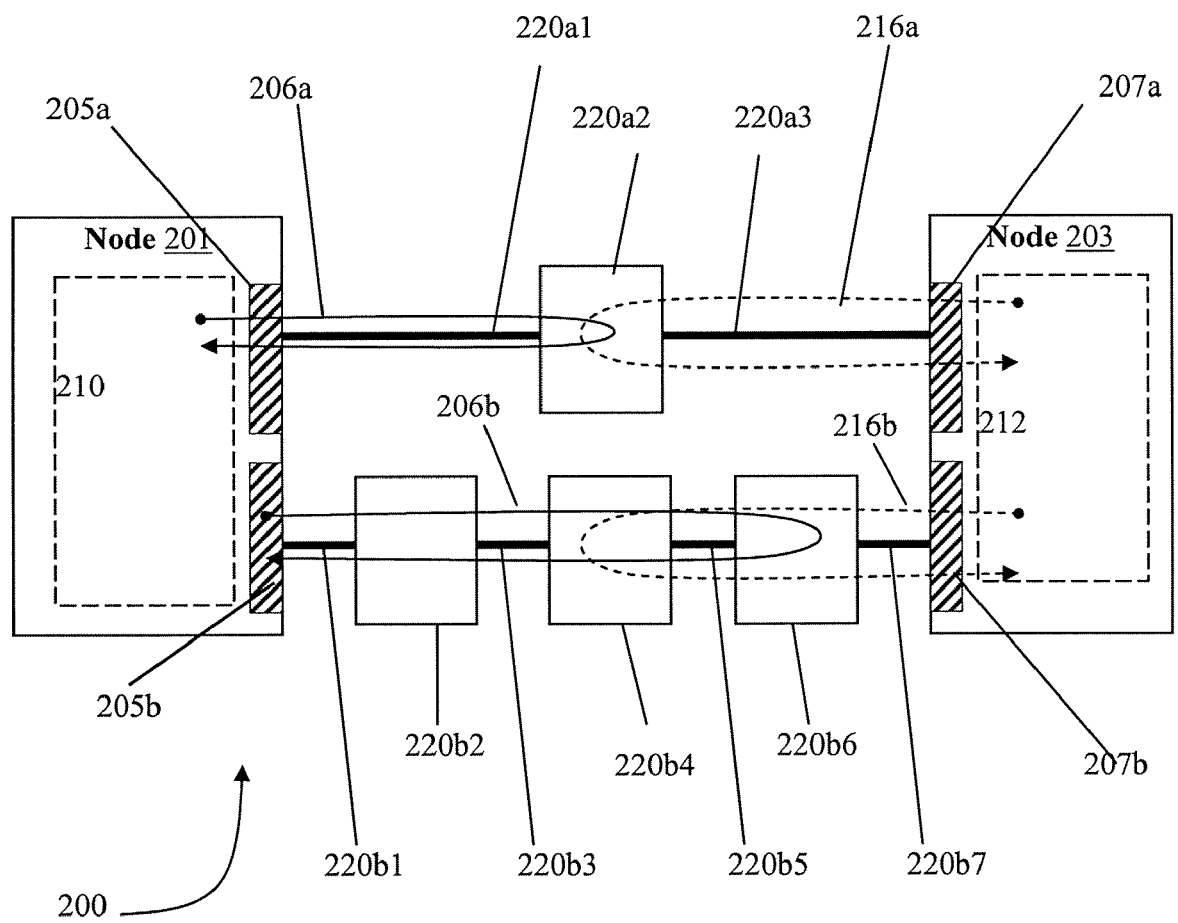
FIG. 4A is a system diagram showing loop-back route mechanisms according to preferred embodiments of the invention.

FIG. 4A is a system diagram for a possible implementation of the system 200 of FIG. 3 in which some components of the communication paths are depicted in more detail, and in accordance with preferred embodiments of the invention. The communication sub-channel 220a of FIG. 3 is shown to include at least two communication lines 220a1 and 220a3, and a communication switch 220a2. Communication interface 205a of node 201 is connected through the communication line 220a1 to the communication switch 220a2, which in turn is connected to the communication interface 207a of node 203 through the communication line 220a3. Similarly communication sub-channel 220b of FIG. 3 is shown to include communication lines 220b1, 220b3, 220b5, and 220b7, and communication switches 220b2, 220b4, and 220b6 which in order of their numbers connect communication interface 205b of node 201 to communication interface 207b of node 203. In the preferred embodiment, standard commercial off-the-shelf Ethernet switches and cables are used as communication switches and communication lines.

Utilizing the design shown in FIG. 4A, each node can send self-test messages out and receive them back through a loop-back route utilizing some of the components of a communication path. In the preferred embodiments, the loop-back routes are selected such that each pair of loop-back routes of the two nodes that are located on the same communication path together cover all components of that path. That is, each component of the path is utilized by at least one of the loop-back routes, and thus, that component will be tested when that node utilizes that loop-back route for a self-test. For example, the pair of self-test messages 206a from node 201 and 216a from node 203 are each transmitted out of their originating node on the communication path 205a-220a-207a, and their routes collectively cover all components of this communication path. Specifically self-test messages 206a are sent out from node 201 such that they are first transmitted to switch 220a2 and then are routed back by switch 220a2 to node 201. On the other hand, self-test messages 216a from node 203 are transmitted to switch 220a2 and routed back by that switch to node 203. Thus together, this pair of self-test messages covers all components of the communication path 205a-220a-207a.

Similarly the pair of self-test messages 206b from node 201 and 216b from node 203 are each transmitted out of their originating node on the communication path 205b-220b-207b, and their routes collectively cover all components of this communication path. Specifically self-test messages 206b are transmitted from node 201 to switches 220b2, 220b4, and 220b6 respectively, and routed back by switch 220b6 to node 201 through switches 220b4, and 220b2, respectively. On the other hand, self-test messages 216b are transmitted from node 203 to switches 220b6, and 220b4 respectively, and routed back by switch 220b4 to node 203 through switch 220b6. Thus together this pair of self-test messages covers all components of the communication path 205b-220b-207b.

Figure 4B:
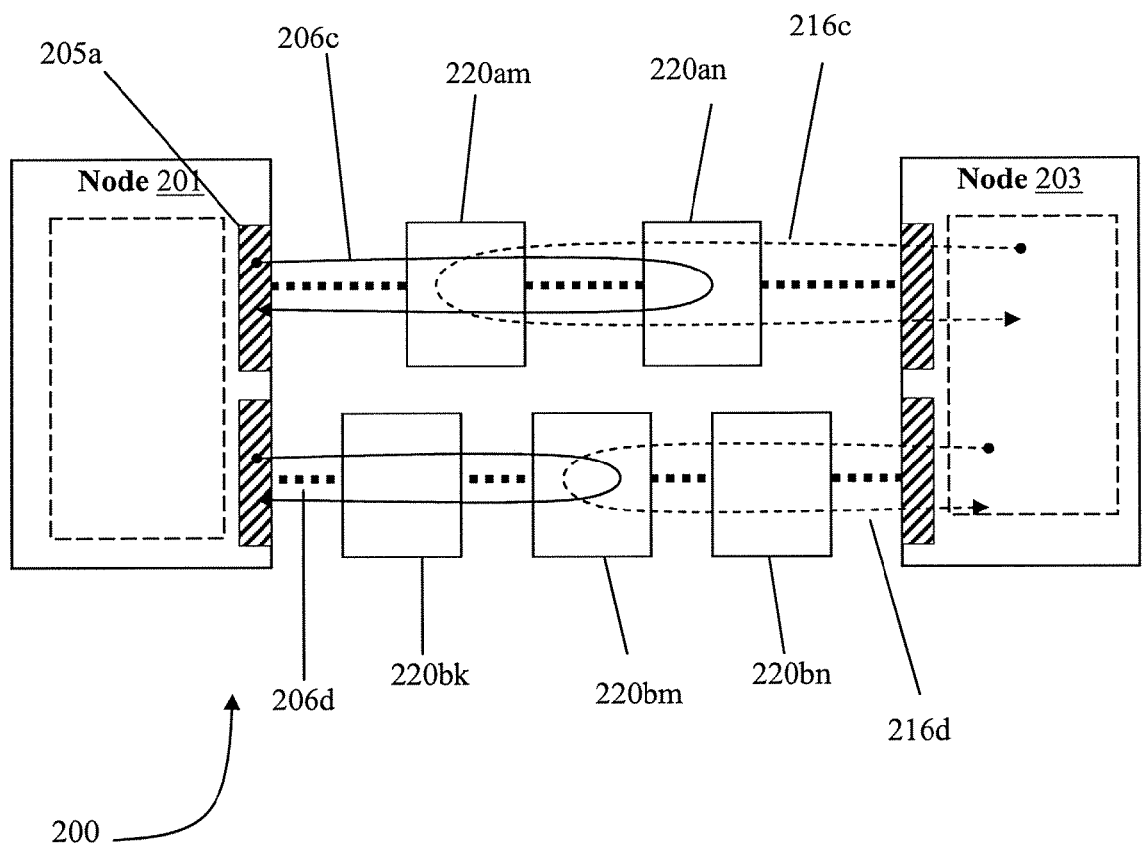
FIG. 4B is another system diagram showing loop-back route mechanisms according to preferred embodiments of the invention.

FIG. 4B is a system diagram for another implementation of system 200 of FIG. 3, in accordance with the preferred embodiments of the invention. In FIG. 4B, the communication sub-channel 220a has a plurality of switches, among which switches 220am, and 220an, are shown. Communication sub-channel 220b also includes a plurality of switches, among which switches 220bk, 220bm, and 220bn are shown. The switches in each communication path are connected to each other and to the nodes via communication lines that are not shown.

FIG. 4B depicts the pair of self-test messages 206c by nodes 201 and 216c by node 203, that are sent out over communication path 205a-220a-207a and together cover all components of that path. Self-test messages 206c are sent out by node 201 such that they are transmitted through a first set of switches, which include switch 220am, up to switch 220an and are returned by switch 220an back to node 201, through the same first set of switches. Self-test messages 216c, on the other hand, are sent out by node 203 such they are transmitted through a second set of switches, which include switch 220an, down to switch 220am and are returned by switch 220am back to node 203, through the same second set of switches. Thus the routes of the pair of self-test messages 206c and 216c together cover all communication interfaces, switches and lines in communication path 205a-220a-207a and they share at least switches 220am, 220an, and all switches and lines located between these two switches, along that path.

FIG. 4B also depicts the pair of self-test messages 206d by nodes 201 and 216d by node 203, that are sent out over communication path 205b-220b-207b and together cover all components of that path. Self-test messages 206d are sent out by node 201 such that they are transmitted through a third set of switches, which include switch 220*bk*, up to switch 220*bm* and are returned by switch 220*bm* back to node 201, through the same third set of switches. Self-test messages 216*d*, on the other hand, are sent out by node 203 such that they are transmitted through a fourth set of switches, which include switch 220*bn*, down to switch 220*bm* and are returned by switch 220*bm* back to node 203, through the same fourth set of switches. Thus the routes of the pair of self-test messages 206*d* and 216*d* together cover all communication interfaces, switches and lines in communication path 205*b*-220*b*-207*b*, and they share the switch 220*bm*.

The above self-test mechanisms require some components of each communication path to collectively direct the self-test messages along the desired loop-back routes. In the absence of any special configuration or programming, the commercial Ethernet switches used in the preferred embodiments normally discard loop-back packets rather than forwarding them anywhere. But such switches can be configured or programmed to recognize certain loop-back packets, distinctively identified as self-test messages, and send them along desired loop-back routes.

On each communication path and for each node, a loop-back route is defined, which starts on the node, goes out on the communication path along one or more communication lines and communication switches, until it reaches a most distant switch, where it reverses and travels back to the original node through the same communication lines and communication switches or through other communication lines and switches. In usual Ethernet embodiments, these mechanisms require programming the nodes, the communication interfaces of each node, and the switches along the path, in order to recognize the desired loop-back packets and to define the desired loop-back routes. In some other embodiments, for example, using InfiniBand networking technology, the desired route of a message can be specified by point-to-point directions encoded within a header of the message itself, and in such networks the switches need not be programmed with any knowledge of the loop-back routes to be used.

Each loop-back route for a node and a path is defined by a point-to-point specification of the route, naming every communication switch and every communication line along the route. In the preferred Ethernet embodiments, each route is programmed into the nodes, the communication interface of the node, and the switches, such that for every self-test message sent along the route, each receiving switch recognizes the message as a self-test message rather than a packet to be discarded and knows to which next switch or communication interface to direct the packet in order to continue it along its intended route. Each node sends out its self-test messages through its communication interface with a unique target address that signifies the loop-back route to be used. In the preferred embodiment when the network uses standard Ethernet technology, the self-test message is sent as a single Ethernet packet, and the packet is identified as a self-test message and the target address identifying its desired route is specified by placing distinctive values in various fields of the Ethernet packet header of the message. Ethernet header fields, which can hold such distinctive values, include the destination media-access-control (MAC) address field, the source MAC address field, the priority and VLAN identifier fields of the IEEE 802.1Q tag field, and the Ethernet frame protocol type field. Best practice is to code the transmitting node's own Ethernet MAC address in the frame's destination MAC address field and to identify the packet as an intentional loop-back message by placing a unique distinctive value in the VLAN identifier field or the frame protocol type field.

Each switch includes a processor, which is programmed to direct these messages along the loop-back route. The processor uses two inputs to recognize each such self-test message and to determine where to direct the message. The first input the switch processor uses is the target address of the message, as specified by distinctive values seen in the various fields of the message's Ethernet packet header. The second input the switch processor uses is upon which input to the switch the message was received, i.e., upon which communication line it arrived. Using these two inputs and its programmed definition of loop-back routes, the processor determines the next stop in the route, which could be another switch or the originating node, and sends the message to that switch or node. In some embodiments, each switch may not need the second input and may use as an input only the target address as derived from the Ethernet header fields of the packet containing the message in order to determine where to direct the packet. In either case, each originating node starts a self-test packet on its way by encoding a specification of its desired loop-back route into the packet header and then sending the packet to the first switch on the route. Each receiving switch along the route will recognize the packet as a self-test message by its distinctive header values and identify the desired next step along the route by the encoding of the loop-back route specification in the packet header possibly combined with the arriving communication line, and it will then forward the packet to that desired next step. The final step in the route will bring the packet back to its originating node, completing the loop-back process.

Based on the outcome of the health tests, each node may autonomously decide on an action. Each of the two nodes, independent of the other, periodically performs a round of two test sets that include a first set of self-test initiation-reply pairs which test the node itself (test 1) and a second set of test initiation-reply pairs which test the other node (test 2). At the end of each round, based on the combined outcome of tests 1 and 2, each node may perform a corresponding action.

FIG. 5 shows the decision table 500 used by each node to decide what action to take, in accordance to a preferred embodiment of the invention. The values in the first and second columns correspond to the results of the tests 1 and 2 respectively, and the third column corresponds to the action that may result from each of the combined outcomes of the two tests. Without any loss of generality, in the following explanation the node running the tests has been labeled as node 1, and the other node has been labeled as node 2.

In some embodiments, a node marks a test as passed if it receives acceptable replies to the test-initiations sent on one communication path. On the other hand, a node marks a test as failed only after it has tried sending the test-initiations on two different paths and both attempts have failed, as explained above in detail. In some embodiments, the robust communication fabric ensures that all messages sent from an originating node are delivered to the target node, and thus the test does not fail due to a failure in a communication path. For example, the robust communication fabric may utilize two or more redundant internal communication paths between the nodes, and an automated mechanism of retrying alternative paths whenever delivery on one path fails, such that the retry mechanism is transparent to the nodes. In these embodiments, whenever a sent test fails, the originating node may assume that the failure exists in the target node and not in the communication fabric, and, without retrying, the node may mark the test as failed.

The first row (502) of table 500 corresponds to the case when both tests pass. In this case node 1 concludes that both itself and node 2 are healthy, and no action is needed. It thus continues its normal operation.

The second row (504) in table 500 corresponds to the case when the self-test of node 1 passes and the health test performed by node 1 on node 2 fails. In this case, node 1 decides that while it itself is healthy, node 2 is not healthy. Based on this outcome, as table 500 shows, node 1 disables the failed node 2 from performing any tasks towards the service, and takes over all responsibilities of node 2 with regards to the service. In accordance to a preferred embodiment of the invention, a node is allowed to disable another node only after it has assessed itself as healthy.

The third row (506) in table 500 shows the case when node 1 finds out that its self-test has failed, and thus concludes that it itself is not healthy. In this case, node 1, if possible, may cease performing the service. According to the probable scenario in this case, node 2, which is performing its own rounds of tests, finds out that node 1 is not healthy and, assuming that node 2 finds itself healthy, node 2 will disable node 1 and will take over its responsibilities, in accordance with the second row of table 500. In case node 2 also finds out that its own self-test has failed, then the system is in the situation that both nodes have failed; a situation that may not be handled autonomously by a doubly-redundant system and requires outside intervention.

Figure 6A:
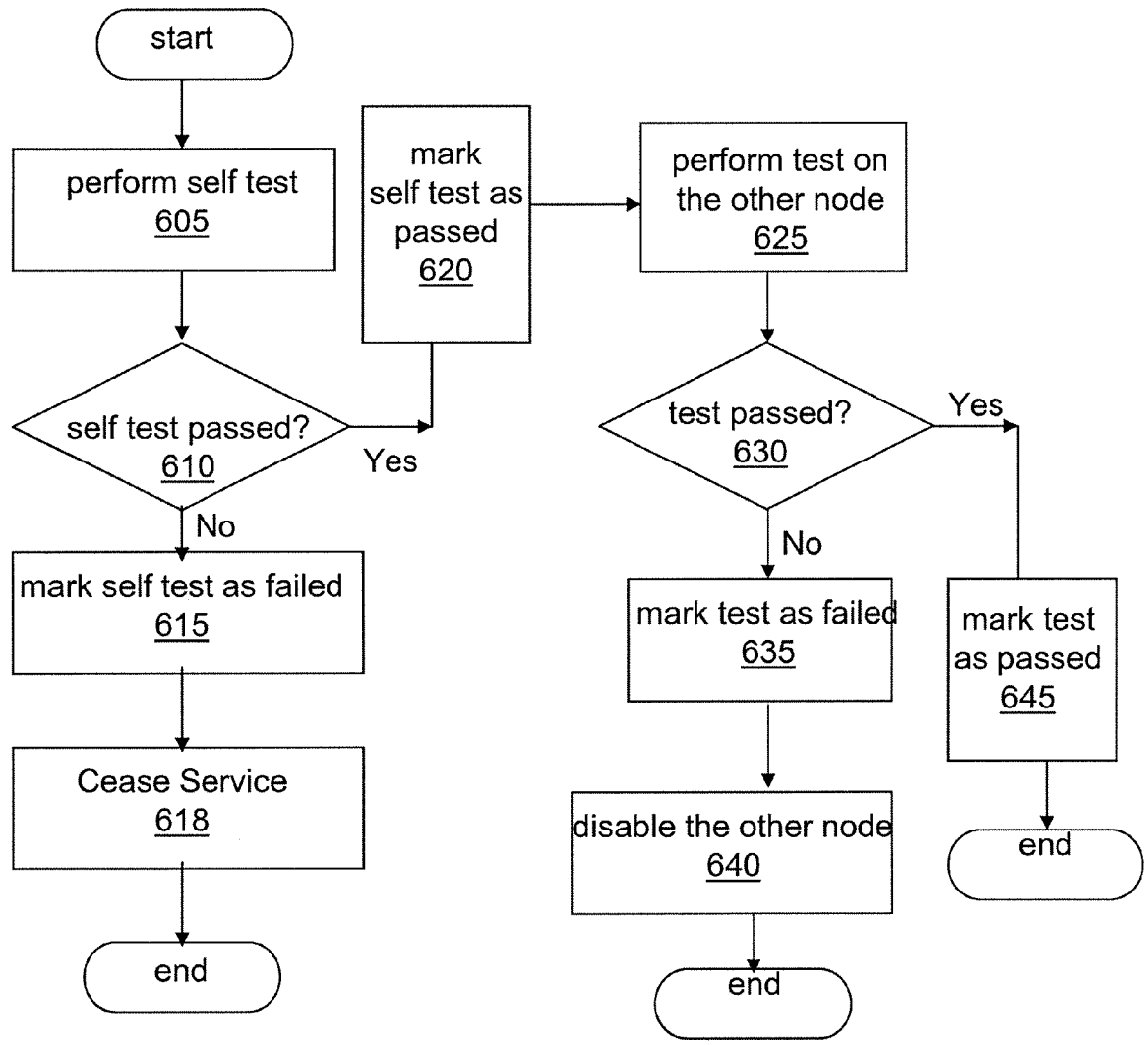
FIG. 6A is a flowchart showing a sequence of actions that each node may take in accordance with some embodiments of the invention.

FIG. 6A is a flowchart 600A showing a sequence of actions that each node may take during each round of tests, in accordance with some embodiments. Each node starts by testing the health of itself (605) utilizing a robust communication fabric. If this self-test fails (610), then the node will mark the self-test as failed (615), may cease performing the service if it case (618), and will exit the round. On the other hand, if the self-test passes (610), the node will mark the self-test as passed (620), and will proceed to testing the other node (625) utilizing the robust communication fabric. If the health test on the other node passes (630), the node will mark this test as passed (645), and exits the round. On the other hand, if the health test performed on the other node fails (630), the node will mark this test as failed (635), and disables that other node (640) before exiting the round.

According to preferred embodiments, utilizing the robust communication fabric requires that in each round if a test fails for the first time, the node may retry performing the test using a communication path different from the path used the first time. The node may conclude that the test has failed, only after the test fails on the second try as well. For these embodiments, whenever a test in chart 600A fails, it implies that the test has failed on both alternate paths.

FIG. 6B is a flowchart 600B depicting the re-testing process in accordance with some embodiments. Each node starts by testing itself (650) utilizing a loop-back route (LPR) through a communication path. If this self-test passes the first time (652), the node will mark the self-test as passed (651), and will proceed to testing the other node (660). On the other hand, if the self-test fails the first time (652), the node may repeat the self-test utilizing a loop-back route through a communication path different from the communication path used for the first loop-back route (654). If this second self-test fails as well (656), then the node will mark the self-test as failed (658), may cease to perform the service if it can (659), and will exit. On the other hand, if the second self-test passes (656), the node will mark the communication path used for the first loop-back route as faulty (657), but the self-test as passed (651) and will proceed to testing the other node (660).

The node starts testing the other node by sending test-initiations to that node utilizing a first communication path. This first communication path may be a path already used during self tests. If this test passes the first time (662), the node will mark the tests as passed (680) and will end the round of tests. On the other hand, if the health test performed on the other node fails the first time (662), the node will repeat those tests utilizing a second communication path that is different from the first communication path (664). The second path may also be a path already used during self test. If this second try fails as well (666), then the node will mark the health test of the other node as failed (668), and disables the other node (670) before exiting the round. On the other hand, if this second try in testing the other node passes (666), the node will mark the second communication path as faulty (667), but the test as passed (680), and will exit the round. In some embodiments, marking a communication path as faulty may cause the nodes to stop using that path for self tests or testing other node, till they are informed that the path is fixed.

Figure 7:
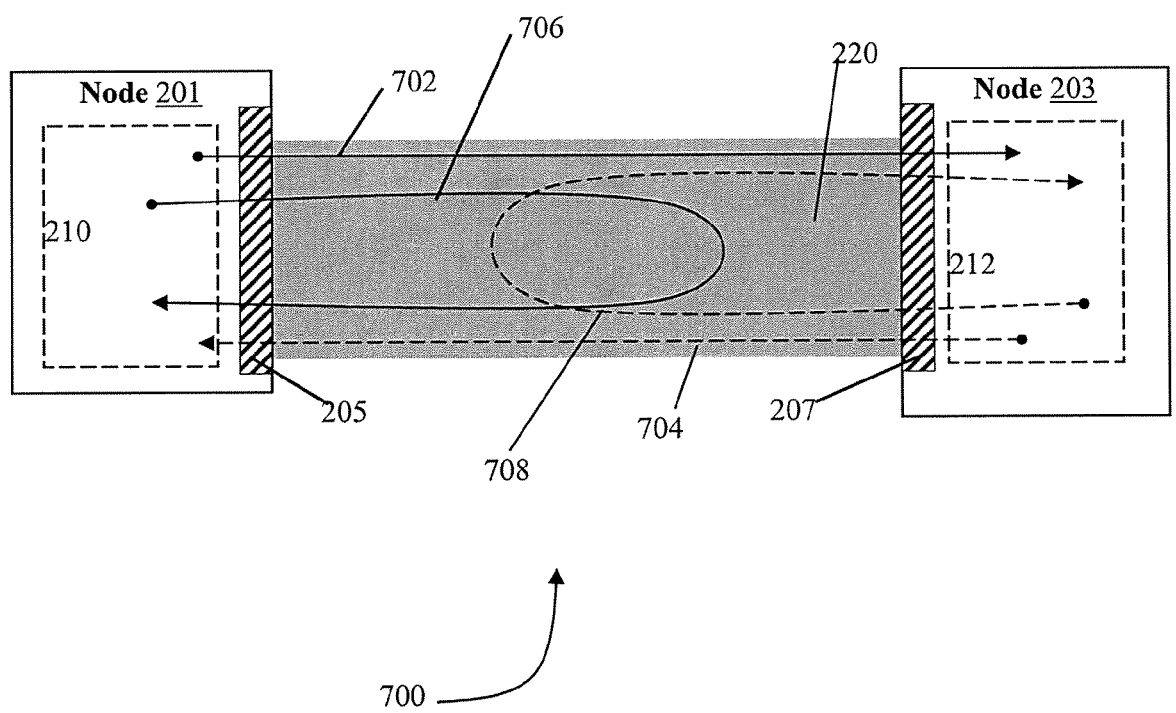
FIG. 7 is a system diagram of an autonomous fault-tolerant two-node system according to a preferred embodiment of the present invention.

FIG. 7 is a system diagram of an autonomous fault-tolerant two-node system 700 according to another embodiment of the invention. The communication fabric 220 and the two nodes 201 and 203 are similar to those of FIG. 2. Each node in system 700 autonomously performs health tests on itself and regularly sends the results as health messages to itself and to the other node. Unlike system 200 in FIG. 2, the nodes in system 700 perform these tasks continuously and not in response to any test-initiation messages. Moreover, each node in system 700 examines the history of health messages received from itself and from the other node and accordingly decides whether itself or the other node is healthy or not.

FIG. 7 depicts the health messages sent by each node to itself and to the other node. The arrow 702 denotes health messages that are sent regularly by node 201 to node 203. The arrow 704, on the other hand, denotes health messages that are sent regularly by node 203 to node 201. The arrow 706 denotes the health messages sent regularly by node 201 to itself and the arrow 708 denotes the health messages sent regularly by node 203 to itself Self-health messages 706 and 708 are each transmitted through a loop-back route as explained before.

In addition to the results of health tests, health messages of each node include message logs. These logs show the history of health messages sent to and received from the other node, for example during an assessment period, and also show the communication paths on which those message were sent or received. Each node uses message logs received from the other node to autonomously assess whether each node, that is itself and the other node, has received health messages sent to it.

Each of the nodes autonomously assesses the health of itself and the other node, respectively, by periodically examining the cumulative health messages received from the assessed node. In the preferred embodiment, each node sends health messages once every tenth of a second and assesses the two nodes once every second. The node marks each assessment as passed or failed based on health messages received from the assessed node since last assessment. Each assessing node applies the decision table 500 to perform an appropriate action. If the assessing node determines that it has received health messages from assessed node (itself or the other node) and that the results reflected in the received messages are acceptable, it will mark the assessed node as healthy. On the other hand, if the above conditions are not met, the assessing node may switch to using an alternative communication path for sending its health messages, to determine whether the source of the problem is in the assessed node or in one of the communication paths in network 220. If the assessing node determines that a communication path has failed, it may log that problem and avoid using the faulty path for sending its health messages. If, on the other hand, the assessing node determines that the assessed node has failed, it may take an action to isolate the faulty node, in accordance to table 500 in FIG. 5.

Figure 8:
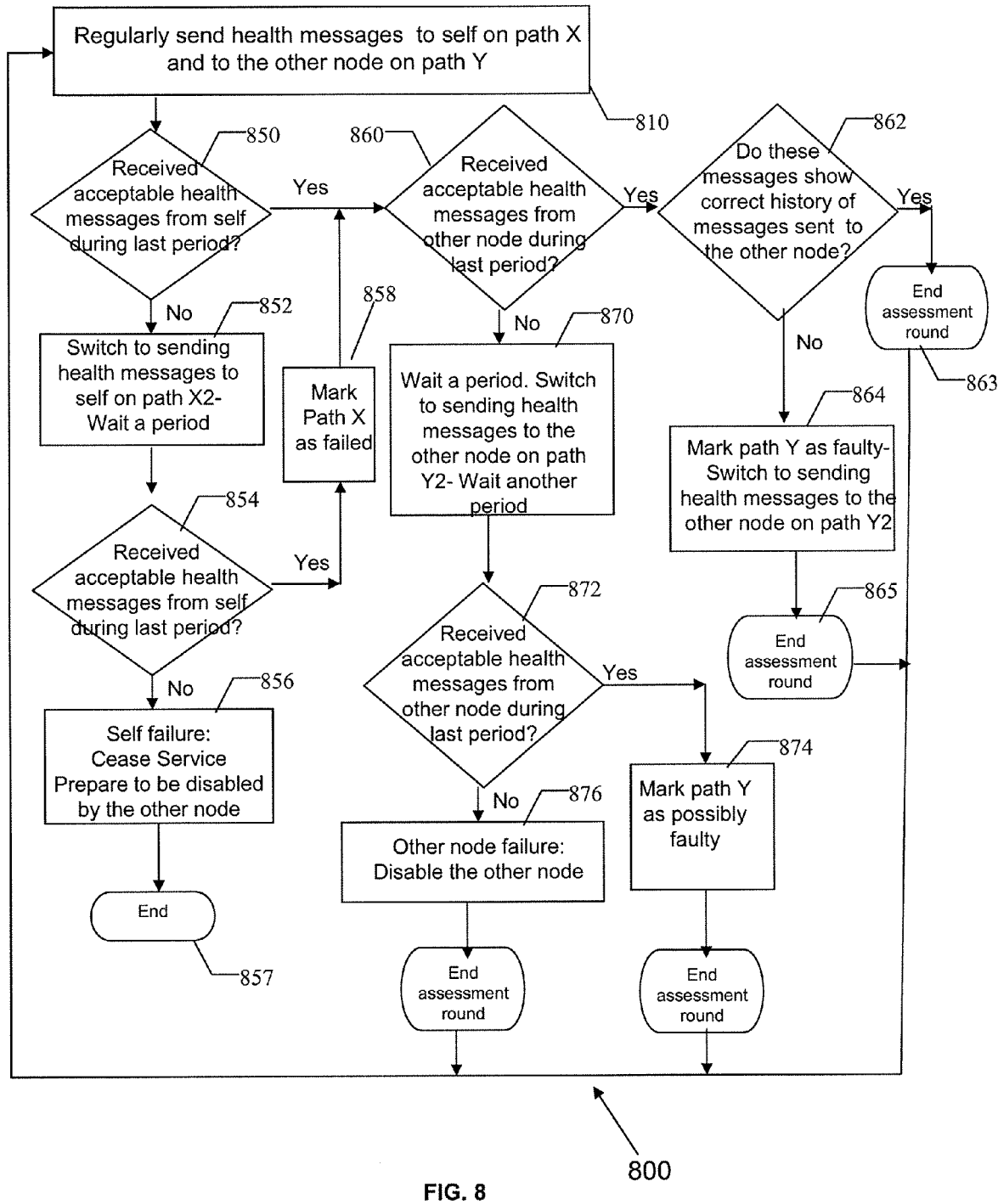
FIG. 8 is a flowchart showing a sequence of actions that each node may take during each assessment round in accordance with preferred embodiments of the invention.

FIG. 8 is a flowchart 800 depicting one round of assessments periodically performed by each node in system 700. Each node, while healthy, regularly sends health messages to itself through a loop-back route on a communication path tentatively called X, and to the other node on a communication path tentatively called Y (810). The two paths X and Y may be the same or different communication paths, and may be selected independent of each other from the set of available paths, e.g., paths 220*a* and 220*b* in FIGS. 3A and 3B, that are not marked as faulty. Each node first assesses itself by examining health messages received from itself during latest assessment period (850). If this self-assessment passes the first time, the node will proceed to assessing the other node (860). On the other hand, if the self-assessment fails the first time, the node may switch to sending its self-health messages through a loop-back route on a communication path X2 that is different from X (852). After some time, for example an assessment period, the node once again assesses itself by examining health messages received from itself during the assessment period (854). If this second self-assessment fails as well, then the node will mark the self-assessment as failed, and may cease to perform the service if it can (856) and stops its assessments (857). On the other hand, if the second self-assessment passes, the node will mark the communication path X as faulty (858), but marks the self-assessment as passed and will proceed to assessing the health of the other node (860).

The assessing node assesses the other node by examining health messages received from the other node during latest assessment period (860). If the assessing node has received an acceptable number of health messages and the test results in those messages are acceptable, the assessing node typically marks the other node as healthy and proceeds to examining the logs in those messages (862). If those logs are consistent with the history of messages sent to and received from the other node, i.e., the logs show that the other node has received an acceptable number of messages sent to it, and that an acceptable number of messages sent by the other node has been received by the assessing node, then the assessing node decides that it has not detected any problem and exits the assessment round (863). On the other hand, if the logs are inconsistent with the history of messages sent to or received from the other node, the assessing node may conclude that there is a fault in the communication path Y. In this case, the assessing node may log this potential failure and switch to using a different communication path Y2 (864).

Alternatively, during assessment 860, the assessing node may find out that it has not received an acceptable number of health messages from the other node or that the test results in received messages are not acceptable. In this case either the other node is faulty, or the other node is sending its health messages through a communication path that has failed and does not deliver the messages to the assessing node. The assessing node logs this problem in the health messages it sends to the other node. Since in this scenario path Y may be faulty, the assessing node waits for a period of time, for example one assessment period, and then switches to sending its health messages to the other node on a path Y2, different from Y (870). If the other node is healthy, it will discover the problem from the message logs that it receives from the assessing node and will switch the path it is using, i.e. the other node performs steps 862 and 864 during its own round of assessments. After another period has elapsed, the assessing node once again assesses the health of the other node by examining health messages received from the other node during latest assessment period (872). If the assessment passes this time, the assessing node determines that the other node is healthy and a fault may exist in path Y (874). On the other hand, if the assessment fails again, the assessing node determines that the fault exists in the other node and disables that node (876).

Figure 9:
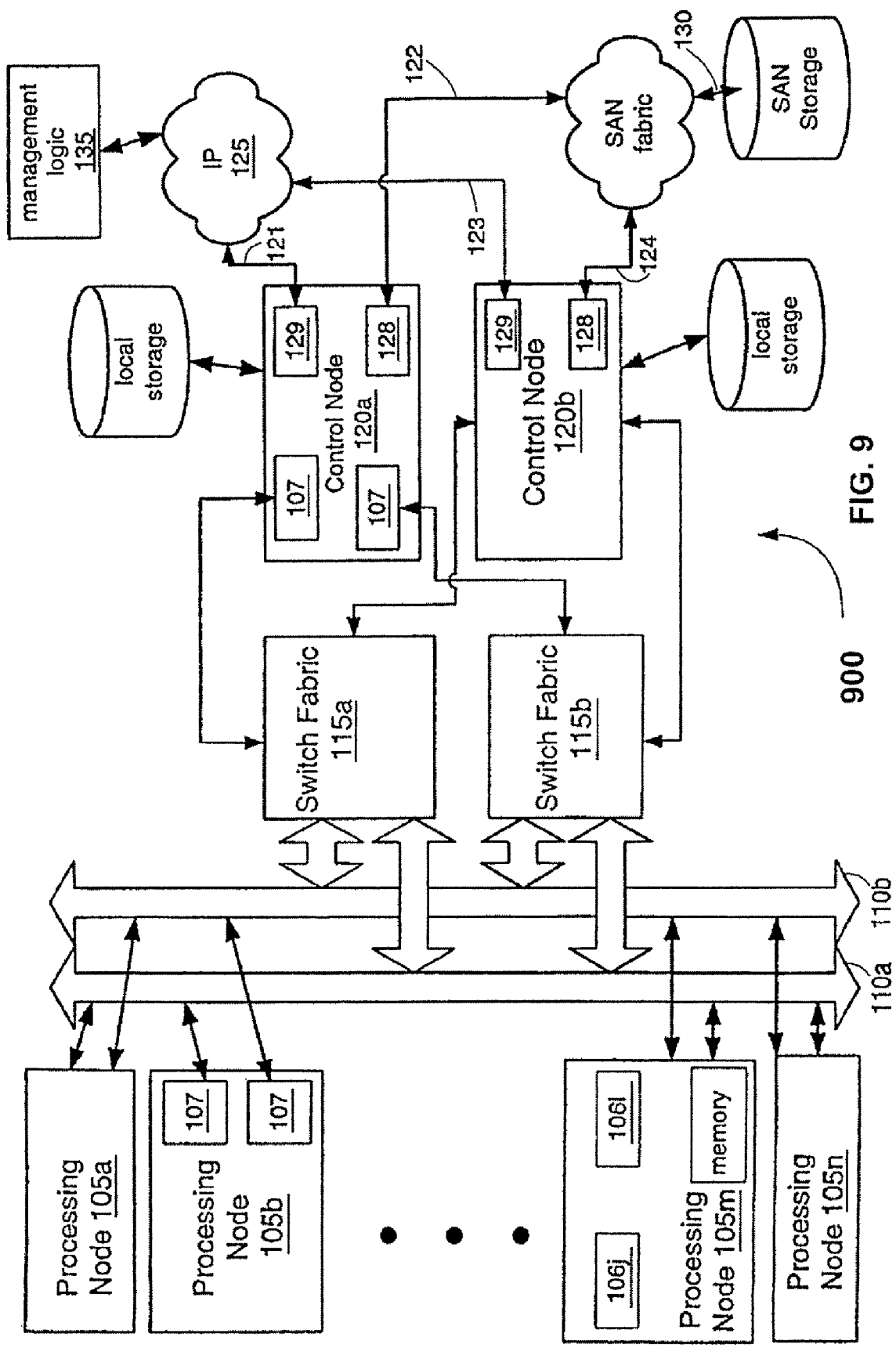
FIG. 9 shows a hardware platform in which preferred embodiments of the present invention have been utilized.

FIG. 9 shows a hardware platform 900, as disclosed in U.S. Pat. No. 7,231,430 entitled "RECONFIGURABLE VIRTUAL PROCESSING SYSTEM, CLUSTER, NETWORK AND METHOD", in which preferred embodiments of the present invention have been utilized. The hardware platform 900 includes a set of processing nodes 105*a-n* connected to a switch fabrics 115*a,b* via high-speed, interconnects 110*a,b*. The switch fabric 115*a,b* is also connected to the two control nodes 120*a,b* that are in communication with each other and the outside world through independent and redundant network paths connecting them to the switch fabrics 115*a,b*.

In accordance with a preferred embodiment, each control node 120*a,b* periodically performs health assessments on itself and on the other control node, and performs actions in accordance with the decision table depicted in table 500 in FIG. 5 and flowchart 800 in FIG. 8. Previously, each of the two control nodes 120*a,b* attempted to assess the health of the two control nodes and to decide whether to disable the other node, without using the redundant switch fabrics 115*a* or 115*b* for sending health messages to itself. Thus, self-tests consisted solely of operations performed within the node itself, with no attempt to communicate outside itself. Such assessments can be less accurate in identifying the failures, and for example, may fail in isolating failures in communication interfaces 105 or 107. In case of such failures, a node with a failed communication interface may mark its self-assessment as passed. The node may then proceed to assess the health of the other node and subsequently mark the other node as unhealthy, since it fails to receive acceptable messages from the other node. Such situations are avoided in the preferred embodiments of the invention, by utilizing loop-back routes for self-tests.

In the preferred embodiment of the invention, a healthy node disables a faulty node by rebooting the faulty node. If the other node remains faulty after a reboot, the healthy node may retry rebooting it for a few more times, before it decides that the other node can not be repaired by rebooting and shuts down the faulty node. In the preferred embodiment, a healthy node disables a faulty node by sending it a command to reboot or to power off through system busses that connect the nodes independent of the communication fabric. The nodes exchange system commands via the busses using an Intelligent Platform Management Interface (IPMI). IPMI is an industry-standard system that allows each node to power off, power on, or send an interrupt to any node, irrespective of whether that node's normal CPU or normal operating system is functioning. In some other embodiments, the nodes communicate these commands using a different industry standard called the Simple Network Management Protocol (SNMP). In yet other embodiments, the nodes may have custom-built hardware to allow exchanging the mentioned commands.

In the preferred embodiment of the invention, each node logs various events in the system log. These events may include detecting a faulty node, or a faulty communication path, disabling a node, or marking a path as faulty and not using it for future communications. These logged events may be used by system administrators to address failures that have not been remedied by reboots or other automatic actions. System administrators may perform periodic maintenances on the system, or may respond to alerts sent by the nodes in the event of some faults, e.g. a node shutdown.

In some embodiments of the invention, system 200 is in an active-passive mode, such that one of the two nodes is the active node, performing all of the tasks related to the service, and the other node is a passive node, waiting to be called to service in case the active node fails or for other related reasons. In other embodiments, system 200 may be in an active-active mode, in which case both nodes are active, each of them performing some of the tasks related to the service and thus dividing the load between them.

In different systems and in different modes, disabling the other node may require different actions depending on the configuration and the state of the system. For example when the two nodes are computers, disabling the other node may mean shutting it off. Also if the system is in an active-passive mode, with node 1 being the passive node and node 2 being the active node, then after disabling node 2, node 1 itself becomes the active node. If node 1 is the active node and node 2 is the passive node, then after disabling node 2, node 1 continues its own role as the active node. If the system is in an active-active mode, then node 1, after disabling node 2, takes over all tasks of node 2, and becomes the only active node in the system. In all these cases the system will become a system with a single active node and no passive nodes. Node 1 may also send out a message, informing the outside world that it has disabled node 2. Node 1 may also restart node 2, and repeat sending health tests to node 2. If node 2 becomes healthy after restart, node 1 may return to the normal mode of operation. Otherwise, it may trigger a mechanism to repair or replace the failed node 2. While node 2 is not available, node 1 may continue running self-tests, and if at some point a self-test fails, it may cease performing the service and may inform the outside world of the full system failure.

Although the preferred embodiment is implemented for two nodes, the extension of the invention to more than two nodes and according to the same rules can be envisioned and is straightforward.

It will be appreciated that the scope of the present invention is not limited to the above-described embodiments of the invention but rather is defined by the appended claims; and that these claims will encompass modifications of and improvements to what has been described.

What is claimed is:

1. A fault-tolerant, two-node system for performing a service in a manner that autonomously isolates and disables a failing node from disrupting said service, the system comprising:

a first and a second node, each including a communication fabric interface;

a fault-tolerant communication fabric having a plurality of switch structures and links, said fabric defining a plurality of communication paths connecting the communication fabric interfaces of the first node and the second node, said fabric providing fault-tolerant loop-back communication in which said first node can send a message to itself utilizing at least one switch structure of said fabric, and in which said second node can send a message to itself utilizing at least one switch structure of said fabric; and wherein each of the two nodes includes logic for performing said service in accordance with a service delivery model, logic for testing the functionality of the respective node to determine whether the respective node is capable of successfully performing said service, logic, responsive to said testing logic, for sending test result messages to the respective node using loop-back communication provided by said fault-tolerant fabric and for sending test result messages to the other node using a communication path defined by said fault-tolerant fabric, fault-isolation logic for analyzing test result messages from the respective node and from the other node to determine whether the respective node or the other node is capable of successfully performing said service; and logic for disabling the other node from performing said service only if the fault-isolation logic determines that the respective node is capable of successfully performing said service and also determines that the other node is incapable of successfully performing said service, said system including logic, responsive to said logic for disabling, for continuing delivery of said service in accordance with said service delivery model.

2. The system of claim 1 wherein the fault-isolation logic analyzes said test result messages to first determine whether the respective node is capable of successfully performing said service, before determining whether the other node is capable of successfully performing said service.

3. The system of claim 1 wherein the fault-isolation logic determines that the other node is incapable of successfully performing said service by receiving test result messages with incorrect content or by failing to receive test result messages from the other node within a specified time frame.

4. The system of claim 1 wherein said logic for testing is initiated autonomously by said respective node.

5. The system of claim 1 wherein said logic for testing is initiated by a request message from the other node.

6. The system of claim 1 wherein said testing logic performs pre-specified tests selected from the group including: test to determine whether a block of node memory can be successfully allocated, test to determine whether a mutual-exclusion lock can be successfully obtained and released, test to determine whether a node can successfully schedule a program thread for execution, test to determine whether a node can successfully read or write a database record, and forward-progress test.

7. The system of claim 1 wherein the logic for disabling the other node includes logic for attempting recovery of the other node by causing the other node to re-boot.

8. The system of claim 1 wherein the logic for disabling the other node includes logic to disable power to the other node.

9. The system of claim 1 wherein the service delivery model is active-passive in which one node is in active status and is responsible for actively performing said service and another node is in passive status and is responsible for maintaining a hot standby state to assume the active status if the one node is disabled from performing said service.

10. The system of claim 1 wherein the service delivery model is active-active in which both nodes are in active status and are responsible for actively performing said service and wherein if one node is disabled from performing said service the other node continues delivery of said service.

11. The system of claim 1 wherein each communication fabric interface includes at least two physical connections to the communication fabric, and wherein the communication fabric defines at least two independent communication paths respectively connecting a first and a second of the two physical connections of the first node to a first and a second of the two physical connections of the second node, and wherein the communication fabric defines at least two independent loop-back routes for each node, each loop-back route having corresponding links and switch structures.

12. The system of claim 11 wherein said logic for sending test result messages includes logic to send said test result messages on a first independent loop-back route and for sending test result messages on a second independent loop-back route, if messages sent on said first loop-back route are not received successfully, the system further including logic to identify said first loop-back route as faulty, if test result messages on said second independent loop-back route are received successfully.

13. The system of claim 11 wherein said logic for sending test result messages includes logic to send said test result messages on a first independent communication path to the other node and for switching to sending test result messages on a second independent communication path, if messages sent on said first independent communication path are not received successfully by the other node, the system further including logic to identify said first independent communication path as faulty, if test result messages on said second independent communication path are received successfully.

14. The system of claim 13 wherein the test result messages received from the other node include a log of messages received by the other node, and wherein said logic for sending test result messages analyzes said log to determine whether messages sent on the first independent communication path are not being received successfully by the other node.

15. The system of claim 13 wherein said logic for sending test result messages switches to sending test result messages on the second independent communication path, if the fault-isolation logic fails to receive test result messages from the other node for a specified time frame, and further the first independent communication path is identified as faulty if the fault-isolation logic receives test result messages with correct content after the switching.

16. The system of claim 11 wherein the logical union of the set of links and switch structures used by a loop-back route for the first node and the set of links and switch structures used by a loop-back route for the second node includes all of the links and switch structures used in an independent communication path connecting the two nodes.

17. The system of claim 11 wherein each loop-back route for each node is defined by a sequence starting and ending at the corresponding node and including the switch structures corresponding to the loop-back route, wherein said logic for sending test result messages attaches to each test message sent on each one of the two loop-back routes a unique target address that signifies the one loop-back route, and wherein each one switch structure in the sequence is programmed to receive the test result message sent on the corresponding loop-back route from the corresponding node or the switch structure that is before the one switch structure in the sequence and, based on the unique target address, to send that message to the switch structure or to the corresponding node which is after the one switch structure in the sequence.

18. A method in a system of two nodes, connected via a fault-tolerant communication fabric that includes a plurality of switch structures and links, for performing a service in a fault-tolerant manner that autonomously isolates and disables a failing node from disrupting said service, the method performed by each of the two nodes comprising:

performing said service in accordance with a service delivery model;

testing the functionality of the respective node to determine whether the respective node is capable of successfully performing said service;

sending test result messages to the respective node using loop-back communication that is provided by said fault-tolerant fabric and utilizes at least one switch structure of said fabric;

sending test result messages to the other node using a communication path defined by said fault-tolerant fabric;

analyzing test result messages from the respective node and from the other node to determine whether the respective node or the other node is capable of successfully performing said service;

disabling the other node from performing said service only if it is determined that the respective node is capable of successfully performing said service and also it is determined that the other node is incapable of successfully performing said service; and continuing delivery of said service in accordance with said service delivery model.

19. The method of claim 18 wherein said test result messages are analyzed to first determine whether the respective node is capable of successfully performing said service, before determining whether the other node is capable of successfully performing said service.

20. The method of claim 18 wherein it is determined that the other node is incapable of successfully performing said service if test result messages received from the other node have incorrect content or no test result messages are received from the other node within a specified time frame.

21. The method of claim 18 wherein testing the functionality of the respective node is initiated autonomously by said respective node.

22. The method of claim 18 wherein testing the functionality of the respective node is initiated by a request message from the other node.

23. The method of claim 18 wherein testing the functionality of the respective node includes performing pre-specified tests selected from the group including: test to determine whether a block of node memory can be successfully allocated, test to determine whether a mutual-exclusion lock can be successfully obtained and released, test to determine whether a node can successfully schedule a program thread for execution, test to determine whether a node can successfully read or write a database record, and forward-progress test.

24. The method of claim 18 wherein disabling the other node includes attempting recovery of the other node by causing the other node to re-boot.

25. The method of claim 18 wherein disabling the other node includes disabling power to the other node.

26. The method of claim 18 wherein the service delivery model is active-passive in which one node is in active status and is responsible for actively performing said service and another node is in passive status and is responsible for maintaining a hot-standby state to assume the active status if the one node is disabled from performing said service.

27. The method of claim 18 wherein the service delivery model is active-active in which both nodes are in active status and are responsible for actively performing said service and wherein if one node is disabled from performing said service the other node continues delivery of said service.

28. The method of claim 18 wherein the communication fabric defines at least two independent communication paths connecting the two nodes, and wherein the communication fabric defines at least two independent loop-back routes for each node, each loop-back route having corresponding links and switch structures, and wherein analyzing test result messages includes diagnosing the communication fabric.

29. The method of claim 28 wherein sending test result messages to the respective node includes sending said test result messages on a first independent loop-back route and sending test result messages on a second independent loop-back route, if messages sent on said first loop-back route are not received successfully, and wherein diagnosing the communication fabric includes identifying said first loop-back route as faulty, if test result messages on said second independent loop-back route are received successfully.

30. The method of claim 28 wherein sending test result messages to the other node includes sending said test result messages on a first independent communication path to the other node and switching to sending test result messages on a second independent communication path, if messages sent on said first independent communication path are not received successfully by the other node, and wherein diagnosing the communication fabric includes identifying said first independent communication path as faulty, if test result messages on said second independent communication path are received successfully.

31. The method of claim 30 further comprising including in the test result messages sent by each of the two nodes to other node a log of messages received from the other node, and wherein said log in the test result messages from the other node is analyzed to determine whether messages sent on the first independent communication path are not received successfully by the other node.

32. The method of claim 30 further including switching to sending test result messages on the second independent communication path if no test result messages are received from the other node for a specified time frame, and wherein diagnosing the communication fabric includes identifying said first independent communication path as faulty if test result messages are received from the other node with correct content after the switching.

* * * * *